Patented June 24, 1941

2,246,974

UNITED STATES PATENT OFFICE 2,246,974

ARYLOXY ALKYL ESTERS OF CINNAMIC ACID

Gerald H. Coleman and Bartholdt C. Hadler, Midland, Mich., assignors to The Dow Chemical Company, Midland, Mich., a corporation of Michigan No Drawing. Application February 28, 1940, Serial No. 321,315

8 Claims. (Cl. 260—476)

This invention concerns esters of certain aryloxy alcohols and cinnamic acid, and particularly relates to cinnamic acid esters having the general formula

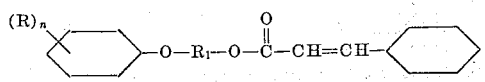

wherein R represents an aryl, cycloalkyl, alkoxy, alkyl containing at least 4 carbon atoms, or halogen substituent, $R_1$ represents a lower alkylene radical containing at least 2 carbon atoms, i. e., a bivalent aliphatic hydrocarbon radical containing from 2 to 6 carbon atoms in which the free valences are borne by different carbon atoms, and $n$ represents the number of substituents on the aryl nucleus and is usually not greater than 2 but may be as high as 4 when the substituent is halogen. All such esters are new compounds useful as plasticizing and modifying agents for vinyl resins, e. g., polystyrene, and cellulose derivative, e. g., ethyl cellulose, cellulose acetate, etc., compositions.

The cinnamic acid esters of the present class are conveniently prepared by esterifying an aryloxy alcohol in which the aryl group is substituted by one or more of the above-mentioned substituents, e. g., beta-(2-xenoxy)-ethanol; gamma-(2-cyclohexyl-phenoxy)-propanol, beta-(3-methoxy-phenoxy)-ethanol, beta-(4-tertiarybutyl-phenoxy)-ethanol, gamma-(2,4-dichloro-phenoxy)-butanol, etc., with cinnamic acid. The reaction is carried out by heating the aryloxy alcohol with approximately one molecular equivalent of cinnamic acid at a temperature of about 60°–130° C. until reaction is complete. If desired, a small proportion of an esterification catalyst, e. g. 0.01–0.04 molecular equivalents of a strong acid, such as sulphuric or benzene sulphonic acid, may be employed. Also, if desired, a water-immiscible organic liquid, such as benzene or toluene, may be added to the reaction mixture for the purpose of promoting distillation and removal of water from the reaction mixture. Upon completion of the reaction, the mixture is treated with sufficient alkali to neutralize any free acid contained therein, washed with water, and the ester product is separated and purified by fractional distillation or crystallization.

The following examples are illustrative of the preparation of several of the esters of the present class but are not to be construed as limiting the invention:

Example 1

A mixture of 194 grams (1 mol) of beta-(4-tertiary-butyl-phenoxy)-ethanol, 148 grams (1 mol) of cinnamic acid, and 5 grams of benzene sulphonic acid was heated at 97°–118° C. for 8 hours in a flask fitted with a dropping funnel, condenser, and a receiver arranged in such manner as to permit distillation of water from the mixture. During the heating, benzene was added slowly through the dropping funnel to facilitate the distillation of water. Upon completion of the reaction, the mixture was cooled, dissolved in benzene, and washed with dilute aqueous sodium bicarbonate and water. The benzene was removed by distillation and the ester product was separated and purified by fractional distillation under vacuum, whereby there was obtained beta-(4-tertiarybutyl-phenoxy)-ethyl cinnamate, a white crystalline solid distilling at approximately 235°–236° C. under 4 millimeters pressure, having a melting point of approximately 56°–57° C. and having the formula:

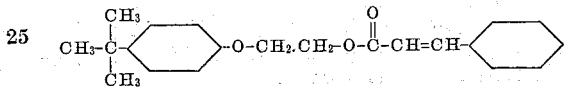

Example 2

A mixture of 117 grams (0.68 mol) of beta-(4-chloro-phenoxy)-ethanol, 100 grams (0.68 mol) of cinnamic acid, and 5 grams of benzene sulphonic acid was heated at a temperature of about 94° to 101° C. for 5 hours while removing water as in Example 1. The mixture was then dissolved in benzene, washed with dilute aqueous sodium bicarbonate, and fractionally distilled under vacuum. There was obtained beta-(4-chloro-phenoxy)-ethyl cinnamate, a white crystalline solid distilling at approximately 225°–227° C. under 4 millimeters pressure, having a melting point of approximately 65.5°–67.5° C., and having the formula

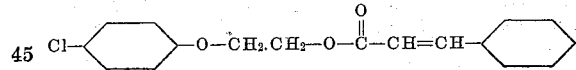

Example 3

A mixture of 168 grams (0.76 mol) of beta-(2-cyclohexyl-phenoxy)-ethanol, 111 grams (0.75 mol) of cinnamic acid, and 5 grams of benzene sulphonic acid was heated at a temperature of 80° to 95° C. for 7 hours and the ester product thereafter separated as in Example 1. There was obtained beta-(2-cyclohexyl-phenoxy)-ethyl cinnamate, a pale-yellow, viscous liquid distilling at approximately 220° to 225° C. under 1 millimeter pressure and having a specific gravity of about 1.01 at 25°/25° C. and the formula:

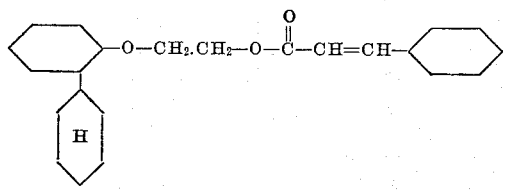

*Example 4*

A mixture of 76 grams (0.26 mol) of beta-(3-bromo-4-xenoxy)-ethanol, 37 grams (0.25 mol) of cinnamic acid, and 5 grams of benzene sulphonic acid was heated at a temperature of about 82° to 85° C. for 7½ hours as in Example 1. The reaction mixture was then dissolved in benzene, washed with dilute aqueous sodium bicarbonate and water, and the benzene was removed by distillation. After recrystallization from benzene, the beta-(3-bromo-4-xenoxy)-ethyl cinnamate product was obtained as a white crystalline solid having a melting point of approximately 115°–116° C. and the formula:

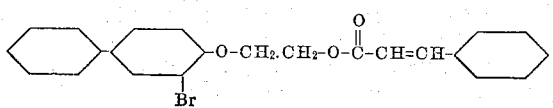

Other aryloxy alcohols which may be reacted with cinnamic acid in a similar manner to prepare the new esters of the present class include gamma-(2,4-dichloro-phenoxy)-propanol, beta-(2-methoxy-phenoxy)-propanol, beta-(4-tertiaryoctyl-phenoxy)-ethanol, gamma-(3-xenoxy)-butanol, beta-(2-methylcyclohexyl-phenoxy)-ethanol, beta-(4-bromo-phenoxy)-propanol, beta-(2-hexyl-phenoxy)-ethanol, beta-(2-lauryl-phenoxy)-ethanol, omega-(2-bromo-phenoxy)-hexanol, beta-(2,4,5,6-tetrachloro-phenoxy)-ethanol, gamma-(4-isopropoxy-phenoxy)-propanol, etc.

This application is a continuation-in-part of our co-pending application Serial Number 177,655, filed December 1, 1937.

We claim:

1. An aryloxy-alkyl ester of cinnamic acid having the general formula:

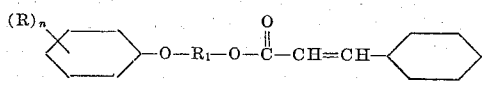

wherein R represents a substituent selected from the group consisting of aryl, cycloalkyl, and alkyl radicals containing at least 4 carbon atoms, and halogen, $R_1$ represents a lower alkylene radical containing at least 2 carbon atoms, and $n$ represents an integer which has a value not greater than 2 when R represents an aryl, cycloalkyl, alkoxy, or alkyl radical containing at least 4 carbon atoms and not greater than 4 when R represents halogen.

2. An aryloxy-alkyl ester of cinnamic acid having the general formula:

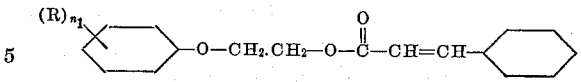

wherein R represents a substituent selected from the group consisting of aryl, cycloalkyl, and alkyl radicals containing at least 4 carbon atoms, and halogen, and $n_1$ represents an integer not greater than 2.

3. An aryloxy-alkyl ester of cinnamic acid having the general formula:

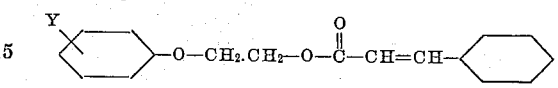

wherein Y represents an alkyl radical containing at least 4 carbon atoms.

4. Beta-(4-tertiarybutyl-phenoxy)-ethyl cinnamate, a white crystalline solid distilling at approximately 235°–236° C. under 4 millimeters pressure, melting at approximately 56°–57° C., and having the formula:

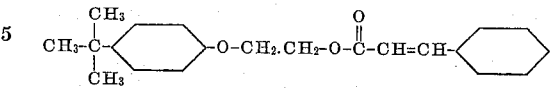

5. An aryloxy-alkyl ester of cinnamic acid having the general formula:

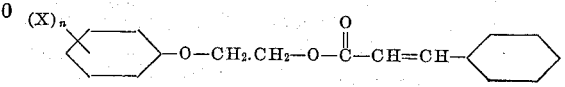

wherein X represents halogen, and $n$ represents an integer not greater than 4.

6. Beta-(4-chloro-phenoxy)-ethyl cinnamate, a white crystalline solid distilling at approximately 225°–227° C. under 4 millimeters pressure, melting at approximately 65.5°–67.5° C., and having the formula:

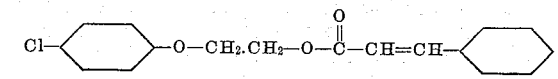

7. An aryloxy-alkyl ester of cinnamic acid having the general formula:

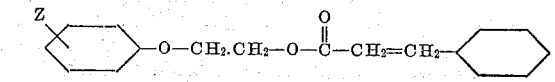

wherein Z represents a cycloalkyl group.

8. Beta-(2-cyclohexyl-phenoxy)-ethyl cinnamate, a liquid distilling at approximately 220°–225° C. under 1 millimeter pressure and having a specific gravity of about 1.01 at 25°/25° C. and the formula:

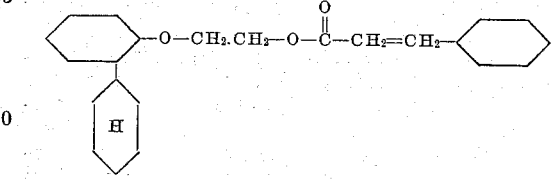

GERALD H. COLEMAN.
BARTHOLDT C. HADLER.